Figure 1:
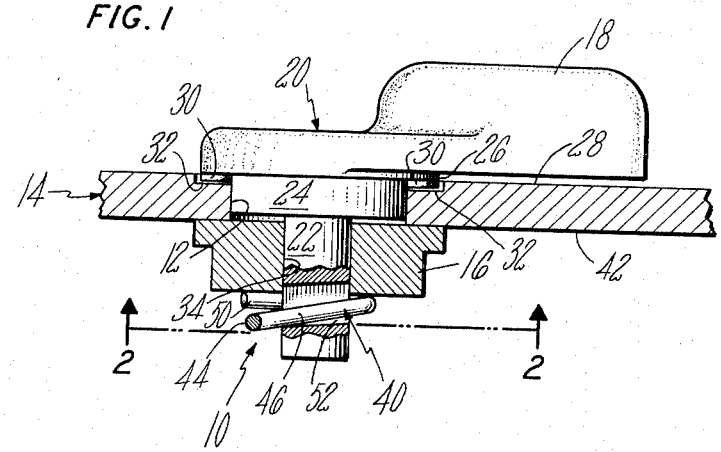

United States Patent [19]

Into

[11] 3,799,684
[45] Mar. 26, 1974

[54] FASTENER AND ASSEMBLY

[75] Inventor: Henry A. Into, Farmington, Conn.

[73] Assignee: Colt Industries Operating Corp., Hartford, Conn.

[22] Filed: Mar. 10, 1972

[21] Appl. No.: 233,558

[52] U.S. Cl. .................. 287/52.07, 24/201 LP
[51] Int. Cl. ............................................. F16d 1/06
[58] Field of Search .................. 85/8.3, 8.1, 8.8; 287/53 TC, 52.07; 24/201 LP, 201 SL, 218

[56] References Cited
UNITED STATES PATENTS
| | | | |
|---|---|---|---|
| 1,438,551 | 12/1922 | Prym | 24/218 |
| 3,263,552 | 8/1966 | Fischer | 85/8.3 |
| 1,386,918 | 8/1921 | Westrup | 24/201 LP |
| 2,921,653 | 1/1960 | Cale | 85/8.1 X |

FOREIGN PATENTS OR APPLICATIONS
| | | | |
|---|---|---|---|
| 1,191,194 | 5/1970 | Great Britain | 85/8.1 |

*Primary Examiner*—Andrew V. Kundrat
*Attorney, Agent, or Firm*—Prutzman, Hayes, Kalb & Chilton

[57] ABSTRACT

A fastener assembly featuring a spring clip having a U shaped bight with retaining arms integrally joined at opposite ends of the bight and reversely bent in opposite directions for quick and easy assembly and removal from a shanked fastener part, the bight being in a plane angularly offset from at least one of the arms to effect axial loading on the shanked fastener part relative to a support member.

4 Claims, 2 Drawing Figures

PATENTED MAR 26 1974  3,799,684

3,799,684

FASTENER AND ASSEMBLY

This invention generally concerns fastener devices and particularly relates to an easily releasable fastener of a wirelike material.

A primary object of this invention is to provide a spring clip fastener which is quickly and easily secured and removed from an apertured fastener part for securing that part in assembled relation to a frame or support member.

Another object of this invention is to provide such a fastener having a compact and rugged construction which is quickly and easily manufactured at low cost.

A further object of this invention is to provide a fastener of the type described particularly suited for applying an axial loading to a shanked fastener part while maintaining that part in assembly with a frame or support member.

Other objects will be in part obvious and in part pointed out in more detail hereinafter.

A better understanding of the objects, advantages, features, properties and relationships of the invention will be obtained from the following detailed description and accompanying drawing which sets forth an illustrative embodiment and is indicative of the way in which the principle of this invention is employed.

Figure 2:
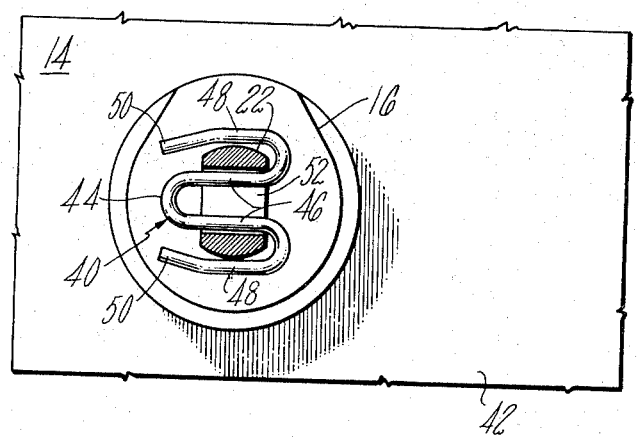

In the drawing:

FIG. 1 is a view partly in section and partly broken away, showing a fastener assembly incorporating this invention; and FIG. 2 is a sectional view, partly broken away, taken generally along line 2—2 of FIG. 1.

Referring in detail to the drawing, a preferred embodiment of this invention is incorporated in a fastener assembly 10 shown for illustrative purposes as being mounted in an aperture 12 of a frame or support member 14. While this invention has a wide variety of different applications, for purposes of this description it will be assumed that the assembly 10 is mounted on the frame 14 for moving a driven member or cam 16 into selected positions relative to the frame 14.

For this purpose, a manually actuated lever 18 is provided on a fastener part 20 having an integral shank 22 including a rotary hub 24 coaxially formed adjacent an enlarged shoulder 26 on the fastener 20 which shoulder 26 is in overlying lapping relation to a wall 28 on one side of the frame 14. The inside wall of the shoulder 26 carries a pair of detent projections 30, 30 which are shown received in grooves 32, 32 which will be understood to be a pair of a series of pairs of grooves extending laterally outwardly of the aperture for receiving the detent projections 30, 30 for positioning the fastener part 20 in different selected positions on the frame 14.

In the specifically illustrated embodiment of this invention, the cam 16 is suitably apertured to be drivingly connected to the shank 22 which has a configured cross-sectional shape best seen in FIG. 2 which extends through an opening 34 within the cam 16 which is thereby adapted to be driven in opposite angular directions in unison with rotary movements of the shank 22 while also being movable axially relative to the shank 22.

To maintain the components in assembly while permitting at least limited movement of the shank 22 axially relative to the cam 16 and the frame 14 in a rugged, compact assembly incorporating a minimum number of parts particularly suited to be quickly and easily disassembled and reassembled, a spring retaining clip 40 formed of a continuous wirelike material is removably secured to the shank 22 to effect an axial loading urging the fastener shoulder 26 toward engagement with wall 28 of the frame 14 while at the same time biasing the cam 16 axially of the shank 22 toward bearing engagement against wall 42 of the frame 14.

More specifically, the clip 40 is preferably formed of resilient stainless steel wire although it may be formed of other suitable and preferably non-corosive wire-like material, e.g., such as a suitable plastic. The clip 40 has a generally "U" shaped bight 44 with aligned generally parallel elongated legs 46, 46 contained in a common plane, and a pair of shank embracing arms 48, 48 are secured respectively to the ends of the legs 46, 46 and are reversely bent in opposite directions to extend in generally parallel relation to one another alongside their respective adjacent legs 46, 46 as viewed in FIG. 2. The arms 48, 48 are shown contained in a common plane angularly offset to that plane containing the bight 44 as best seen in FIG. 1.

To positively secure the clip 40 to the shank 22, the arms 48, 48 are each provided with an integral free end portion 50, 50 bent respectively toward the bight 44 such that the spacing therebetween is somewhat less than the spacing between the arms 48, 48 and the legs 46, 46 of the bight 44.

By virtue of the above described construction, the clip 40 is quickly and easily assembled and disassembled relative to the shank 22. Assembly is accomplished merely by inserting the bight 44 through a generally laterally extending opening 52 in the shank 22 intermediate its opposite ends to flex the free end portions 50, 50 of the arms 48, 48 outwardly from the bight 44 to ride over opposite portions of the shank 22 such that upon extending the closed end of the bight 44 through the shank opening 52, the arms 48, 48 spring back to their normal position as seen in FIG. 2 and positively secure the clip 40 to the shank 22. Removal of the clip 40 is readily effected as will be obvious from the drawing by the intentional application of force to thrust the closed end of the bight 44 through the opening 52.

Such assembly and disassembly of the spring clip 40 is further facilitated by forming the shank opening 52 at a preselected angle relative to a diametrical plane extending through the shank 22. In the illustrated embodiment, the axis of the opening 52 is formed at an approximately 4° angle to a diametrical plane of the shank 22 whereby the clip 40 may be more easily assembled and disassembled while at the same time providing bearing engagement against the legs 46, 46 of the bight 44 adjacent its closed end which provides increased bearing contact relative to mere line contact engagement which would be achieved if the opening 52 were to extend directly laterally across the shank 22. By the provision of the angularly offset retaining arms 48, 48 relative to the bight 44 the desired axial loading is efficiently effected whereby the bight 44 of the clip 40 biases the shank 22 urging the shoulder 26 toward wall 28 of the frame 14 with the arms 48, 48 being disposed in bearing engagement with the face of the cam 16 urging it axially toward wall 42 of the frame 14. In addition, the shank opening 52 is dimensioned and configured relative to the size and location of the cam 16 and bight 44 of the clip 40 to ensure the above described axial loading while at the same time permitting desired limited axial movement of the shank 22 relative to the cam 16 and the frame 14 to effect, e.g., the previously mentioned detenting action.

A fastener assembly 10 constructed in accordance with this inveniton is not only quickly and easily manufactured and assembled but exhibits the significant advantage of being readily removed and thereafter reassembled if desired to again secure the fastener components in assembly. The desired axial loading on the fastener components is additionally achieved by virtue of a simplified rugged clip 40 which not only is trouble-free but is self-adjusting during any detenting action to continuously provide resilient self-latching which is designed well within the elastic limits of the spring clip 40 for use in a wide variety of applications.

As will be apparent to persons skilled in the art, various modifications, adaptations and variations of the foregoing specific disclosure can be made without departing from the teachings of the present invention.

I claim:

1. An easily releasable spring clip attachable to an apertured shank of a fastener, the spring clip being formed of a continuous length of a resilient wirelike material having a generally U shaped bight with elongated parallel legs removably insertable into an opening of the fastener shank, and a pair of shank embracing arms integrally joined to the legs of the bight, the arms having connecting portions integral with the bight and reversely bent in opposite directions, each arm having an intermediate portion being parallel to the other and extending from its connecting portion alongside its respective leg and terminating in a free end portion bent in a direction toward the free end portion of the other arm, at least one of the shank embracing arms being contained in a plane angularly offset from a plane containing the bight.

2. The spring clip of claim 1 wherein the intermediate and free end portions of the arms are contained in said plane angularly offset from the plane containing the bight, and wherein the connecting portions of the arms integrally join their respective legs of the bight at the intersection of said first and second planes.

3. A fastener assembly mountable on an apertured support and comprising a fastener having a shoulder on one side of the support in overlying relation thereto and a shank of reduced size relative to the shoulder of the fastener, the shank extending through the apertured support and having an opening in the shank disposed on the other side of the support, the shank having a bight engaging surface defining a wall of the opening with the axis of said opening contained in a plane extending in inclined relation to a diametrical plane of the shank, and a spring retaining clip operatively mounted between the fastener shank and the support, the clip having a U shaped bight removably insertable into the shank opening for engagement with its bight engaging surface, the clip having a pair of shank embracing arms integrally joined at opposite ends of the bight, the arms being reversely bent in opposite directions to extend in generally parallel relation to one another in a common plane about opposite sides of the fastener shank, at least one of the shank embracing arms being offset from a second common plane containing the bight to apply an axial loading to the fastener urging its shoulder toward said one side of the support while additionally maintaining the fastener in assembly therewith, and the shank opening being of sufficiently enlarged size relative to the bight of the clip to permit limited axial movement of the fastener in a direction parallel to the axis of its shank.

4. A fastener assembly mountable on an apertured support and comprising a fastener having a shoulder on one side of the support in overlying relation thereto and a shank of reduced size relative to the shoulder of the fastener, the shank extending through the apertured support and having an opening in the shank disposed on the other side of the support, and a spring retaining clip operatively mounted between the fastener shank and the support, the clip having a U shaped bight removably insertable into the shank opening with a pair of shank embracing arms integrally joined at opposite ends of the bight, the arms being reversely bent in opposite directions to extend about opposite sides of the fastener shank, at least one of the shank embracing arms being offset from a common plane containing the bight to apply an axial loading to the fastener urging its shoulder toward said one side of the support while additionally maintaining the fastener in assembly therewith, the fastener shank serving as a rotary hub for the fastener, a driven member being disposed on the other side of the support opposite said one side and drivingly connected to the shank for simultaneous rotary movement with the fastener, the driven member being movable axially of the shank, and the shank embracing arms of the spring clip biasing the driven member against the support with the bight of the clip biasing the shank axially to apply said axial loading to the fastener, the spring clip permitting a limited freedom of relative axial movement of the fastener shank relative to the driven member and the support against the biasing force of the spring clip.

* * * * *